United States Patent
Wen et al.

(10) Patent No.: US 12,504,793 B2
(45) Date of Patent: Dec. 23, 2025

(54) FOLDABLE ELECTRONIC DEVICE

(71) Applicant: Acer Incorporated, New Taipei (TW)

(72) Inventors: Chun-Hung Wen, New Taipei (TW);
Chun-Hsien Chen, New Taipei (TW);
Hui-Ping Sun, New Taipei (TW);
Wen-Neng Liao, New Taipei (TW);
Yu-Ming Lin, New Taipei (TW);
Kuan-Lin Chen, New Taipei (TW)

(73) Assignee: Acer Incorporated, New Taipei (TW)

( * ) Notice: Subject to any disclaimer, the term of this patent is extended or adjusted under 35 U.S.C. 154(b) by 163 days.

(21) Appl. No.: 18/493,776

(22) Filed: Oct. 24, 2023

(65) Prior Publication Data
US 2024/0152187 A1   May 9, 2024

(30) Foreign Application Priority Data
Nov. 2, 2022   (TW) .................................. 111141889

(51) Int. Cl.
*G06F 1/16*       (2006.01)
*H05K 7/20*       (2006.01)

(52) U.S. Cl.
CPC .......... *G06F 1/1681* (2013.01); *G06F 1/1618* (2013.01); *H05K 7/20136* (2013.01)

(58) Field of Classification Search
CPC ........ G06F 1/1681; G06F 1/1618; G06F 1/20; G06F 1/203; H05K 7/20136; H04M 1/022
See application file for complete search history.

(56) References Cited

U.S. PATENT DOCUMENTS

| | | | | |
|---|---|---|---|---|
| 6,437,978 B1* | 8/2002 | Ozaki | .................... | G06F 1/203 |
| | | | | 400/82 |
| 9,201,475 B2* | 12/2015 | Wu | ....................... | G06F 1/1681 |
| 9,740,253 B2* | 8/2017 | Cheng | .................. | G06F 1/1681 |
| 10,289,176 B1* | 5/2019 | Chen | ....................... | G06F 1/206 |
| 10,635,142 B2* | 4/2020 | Cheng | ..................... | E05D 7/00 |
| 10,642,309 B2* | 5/2020 | Cheng | .................... | G06F 1/203 |
| 11,874,713 B2* | 1/2024 | Chen | ................. | H05K 7/20172 |
| 2014/0092544 A1* | 4/2014 | Nishi | .................... | G06F 1/1616 |
| | | | | 361/679.09 |
| 2020/0174530 A1* | 6/2020 | Wu | ....................... | G06F 1/1681 |
| 2020/0192438 A1* | 6/2020 | Chang | .................. | G06F 1/1616 |
| 2021/0165453 A1* | 6/2021 | Townsend | ............. | G06F 1/1616 |

FOREIGN PATENT DOCUMENTS

| | | |
|---|---|---|
| CN | 107977049 | 5/2018 |
| TW | 202042007 | 11/2020 |
| TW | I712355 | 12/2020 |
| TW | 202107237 | 2/2021 |
| TW | 202114505 | 4/2021 |
| TW | 202224542 | 6/2022 |

* cited by examiner

*Primary Examiner* — Anthony Q Edwards
(74) *Attorney, Agent, or Firm* — JCIPRNET

(57) ABSTRACT

A foldable electronic device including a first body, a second body, a hinge module, and a cover is provided. The hinge module is connected to the first body and the second body, such that the first body and the second body are rotated relatively to be folded or unfolded via the hinge module. The hinge module has a protruding rod eccentric to a rotation center of the hinge module. The cover is pivoted to the second body and located on a moving path of the protruding rod. The hinge module drives the cover to be rotated relative to the second body via the protruding rod.

12 Claims, 13 Drawing Sheets

FOLDABLE ELECTRONIC DEVICE

CROSS-REFERENCE TO RELATED APPLICATION

This application claims the priority benefit of Taiwan application serial no. 111141889, filed on Nov. 2, 2022. The entirety of the above-mentioned patent application is hereby incorporated by reference herein and made a part of this specification.

BACKGROUND

Technical Field

The disclosure relates to a foldable electronic device.

Description of Related Art

In recent years, with the increasingly developed technology industry, foldable electronic devices such as notebook computers or smart phones have frequently appeared in daily life. Some of the electronic components inside these foldable electronic devices usually generate heat during operation, which affects their operating performance. Therefore, a cooling element, such as a cooling fan, is usually arranged inside the device to help dissipate the heat generated by the electronic components to the outside of the device.

Taking a notebook computer as an example, since the main heat-generating electronic components (CPU or GPU) are installed in a host, considering the relevant configuration of the host, the heat dissipation direction can only be dissipated from the left, right or rear side of the host close to the screen. However, the left and right sides are usually provided with connection ports or slots, and the front side (relative to the aforementioned rear side), the left side and the right side of the host are usually where the user and his hands are located, so the rear side is often used as a main outlet for cooling airflow. At the same time, with the existing hinge module, it can push part of the host away from the desktop or platform it rests on during a body unfolding process. Therefore, a centrifugal fan is installed in the host, so that the cold air flows into the host and the fan from the bottom of the host, and then the hot air flows out of the host from the rear side of the host.

But also, because the aforementioned hinge module can push the host off the platform, this will also create a gap between the screen and the host during the opening and closing process. In this way, the hot air flow discharged from the rear side of the host may spread from the gap to the bottom of the host, and then the hot air flow that should have been discharged is sucked into the fan again, resulting in poor cooling effect of the fan.

SUMMARY

The invention provides a foldable electronic device, which provides better heat dissipation performance when the body is rotated to be folded or unfolded.

A foldable electronic device including a first body, a second body, a hinge module, and a cover is provided. The hinge module is connected to the first body and the second body. The first body and the second body are rotated relatively to be folded or unfolded via the hinge module. The hinge module has a protruding rod eccentric to a rotation center of the hinge module. The cover is pivoted to the second body. The cover is located on a moving path of the protruding rod. The hinge module drives the cover to be rotated relative to the second body via the protruding rod.

Based on the above, since the cover of the foldable electronic device is driven by the protruding rod of the hinge module, the cover can be synchronously driven to rotate to be folded or unfolded relative to the second body during the rotation for folding and unfolding process of the first body and the second body through the hinge module. Furthermore, the second body can provide additional exhaust openings due to the rotating and unfolding of the cover, so as to improve the heat dissipation performance of the foldable electronic device.

DESCRIPTION OF THE EMBODIMENTS

Figure 1A:
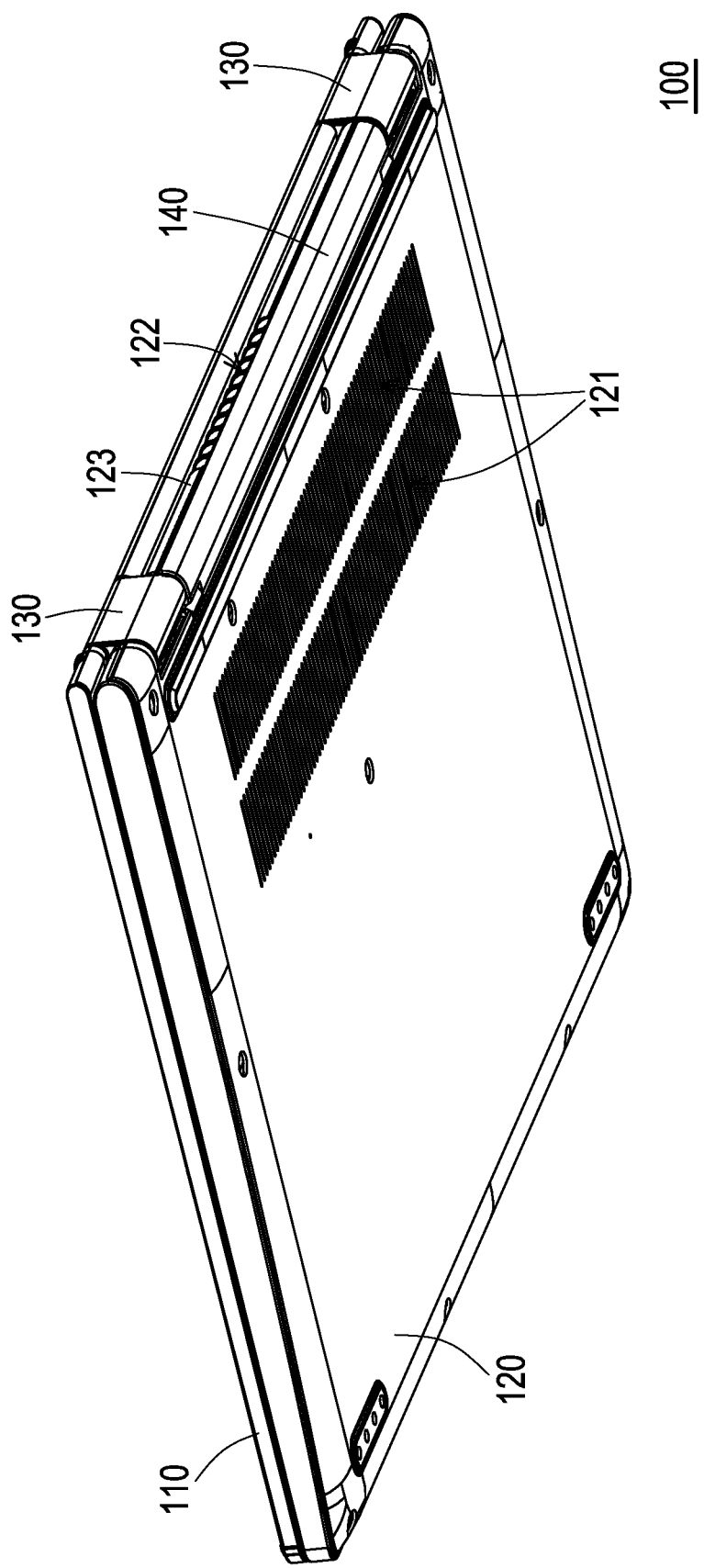
FIG. 1A and FIG. 1B are schematic diagrams of an electronic device according to an embodiment of the invention at different viewing angles.
Figure 1B:
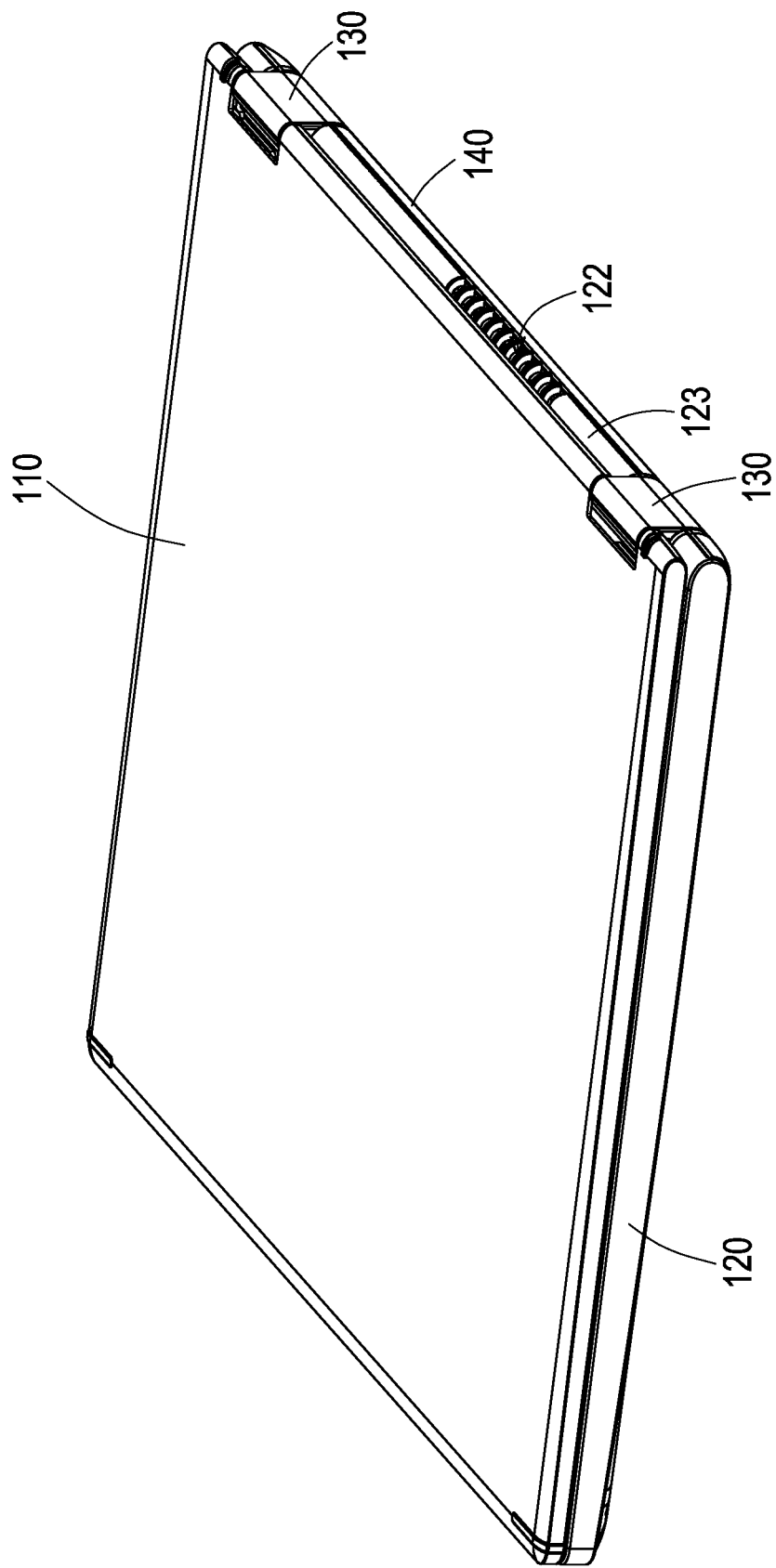

FIG. 1A and FIG. 1B are schematic diagrams of an electronic device according to an embodiment of the invention at different viewing angles. Referring to FIG. 1A and FIG. 1B at the same time, in the embodiment, the electronic device 100 is a foldable electronic device, and a notebook computer is taken as an example here. The electronic device 100 includes a first body 110, a second body 120 and a hinge module 130. The first body 110 is, for example, a display screen of a notebook computer. The second body 120 is, for example, a host of a notebook computer. The hinge module 130 is connected to the first body 110 and the second body 120, such that the first body 110 and the second body 120 are rotated relatively to be folded or unfolded via the hinge module 130. In the embodiment, a pair of hinge modules 130 is taken as an example, but not limited thereto.

Figure 2A:
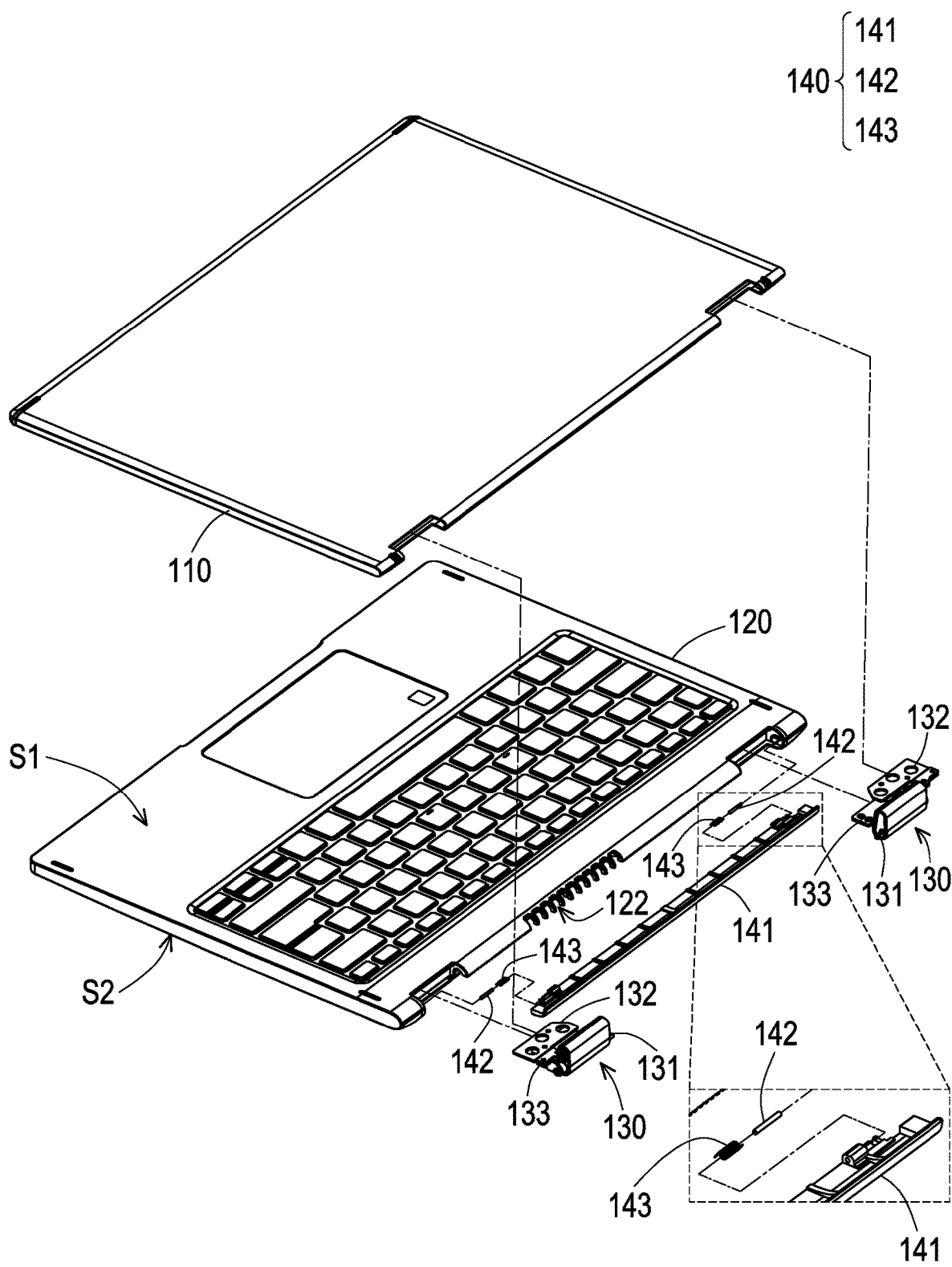
FIG. 2A is an exploded view of an electronic device according to an embodiment of the invention.
Figure 2B:
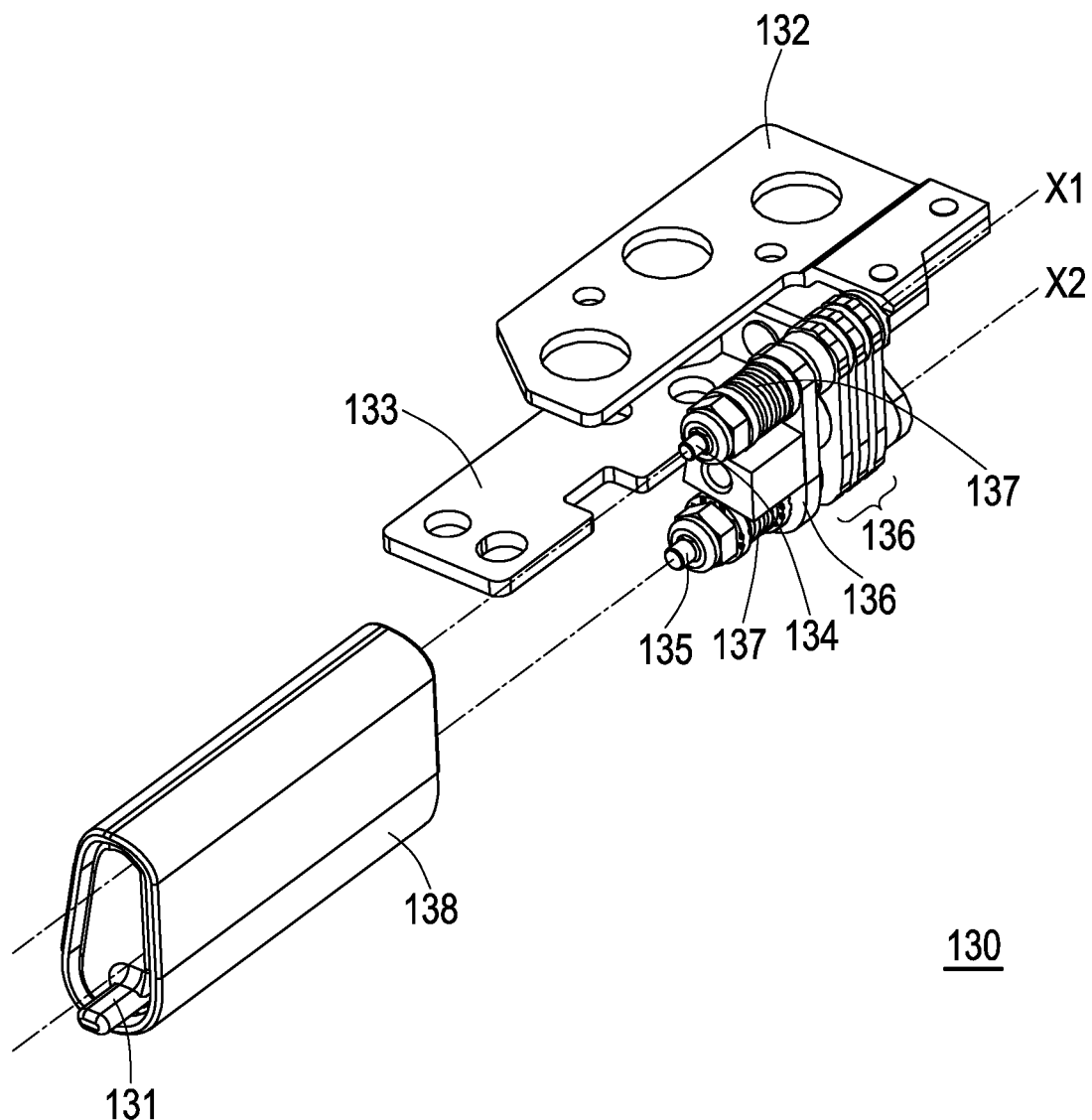
FIG. 2B is an exploded view of a hinge module according to an embodiment of the invention.

FIG. 2A is an exploded view of an electronic device according to an embodiment of the invention. FIG. 2B is an exploded view of a hinge module according to an embodiment of the invention. Referring to FIG. 2A and FIG. 2B at the same time, in the embodiment, the hinge module 130 is, for example, a dual hinge module. The hinge module includes a first bracket 132, a second bracket 133, a first hinge 134, a second hinge 135 and a protruding rod 131, wherein the first bracket 132 is fixed to the first body 110, and the second bracket 133 is fixed to the second body 120. The first hinge 134 has a rotational axis X1, and the second hinge 135 has a rotational axis X2. The rotational axis X1 is parallel to the rotational axis X2. Each of the first hinge 134 and the second hinge 135 has a plurality of torque parts 137 nested thereon to provide the torsion of the hinge. At the same time, the first hinge 134 and the second hinge 135 are combined and confined together through a plurality of combined parts 136. A casing 138 is sheathed on the first hinge 134 and the second hinge 13, and the protruding rod 131 extends from the other side of the casing 138 relative to where the hinge is assembled.

Furthermore, the electronic device 100 further includes a cover 140 arranged between a pair of the hinge module 130. The cover 140 includes a cover portion 141, a pivot shaft 142 and a torsion spring 143. The opposite ends of the cover portion 141 (that is, the two ends adjacent to the hinge module 130) are pivotally connected to the second body 120 through the pivot shaft 142 to pivotally open and close relative to the second body 120. The torsion spring 143 is sleeved on the pivot shaft 142 and its two ends abut against the cover portion 141 and the second body 120, so as to facilitate the reset after the cover portion 141 pivots and unfolds relative to the second body 120.

Figure 3:
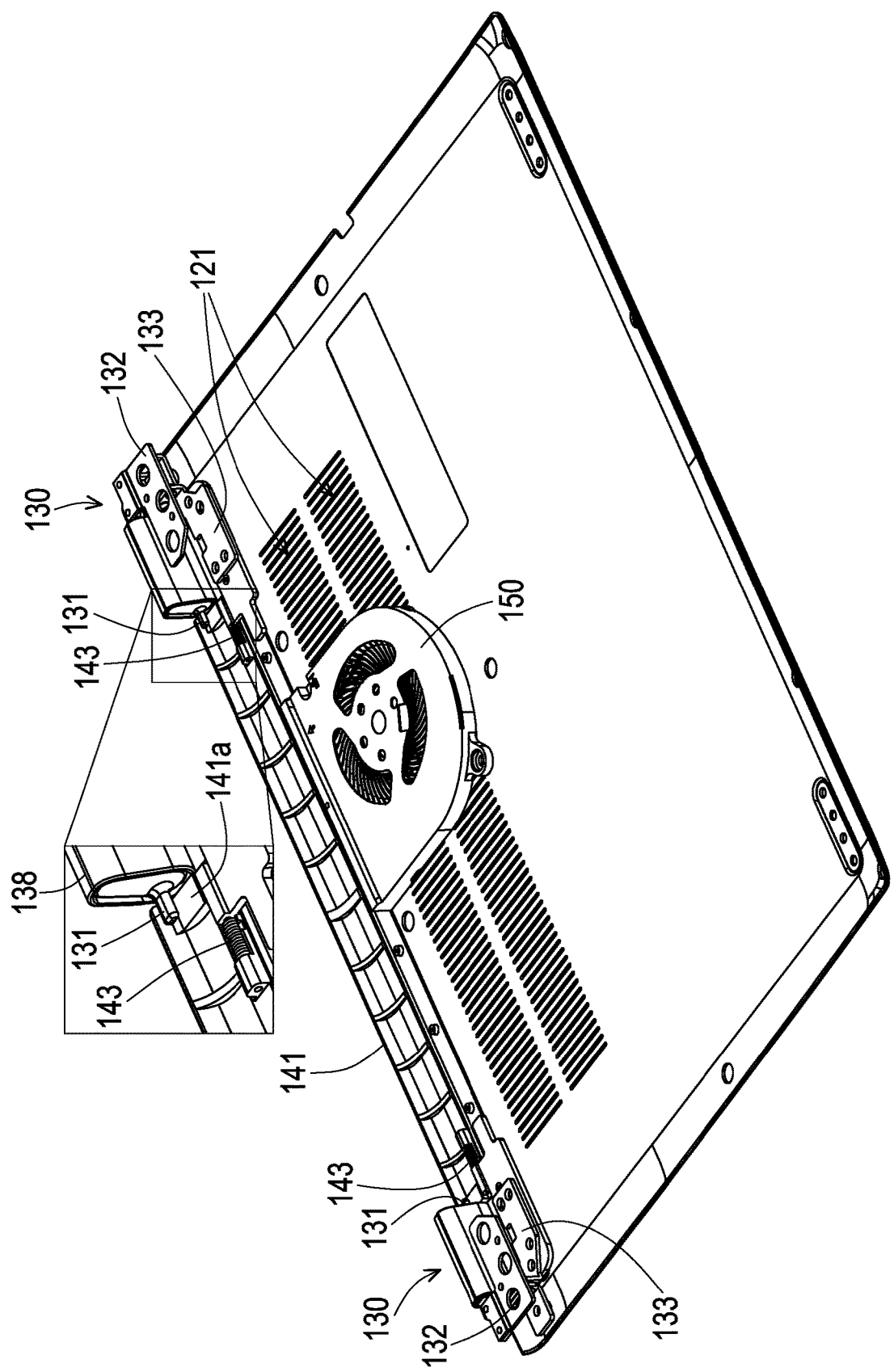
FIG. 3 is a schematic diagram of partial components of the electronic device.

FIG. 3 is a schematic diagram of partial components of the electronic device. Referring to FIG. 2A, FIG. 2B and FIG. 3 at the same time, the protruding rod 131 of the embodiment extends from the casing 138 to the cover portion 141 of the cover 140, and it is substantially moved to the top of the convex seat 141a of the cover portion 141. In this way, the cover portion 141 of the cover 140 is equivalent to being located on the moving path of the protruding rod 131, so that the movement of the hinge module 130 can also drive the cover 140 to rotate and open relative to the second body 120.

Subsequent drawings will respectively describe different folding and unfolding states of the electronic device 100 with partial side views and partial perspective views.

Figure 4:
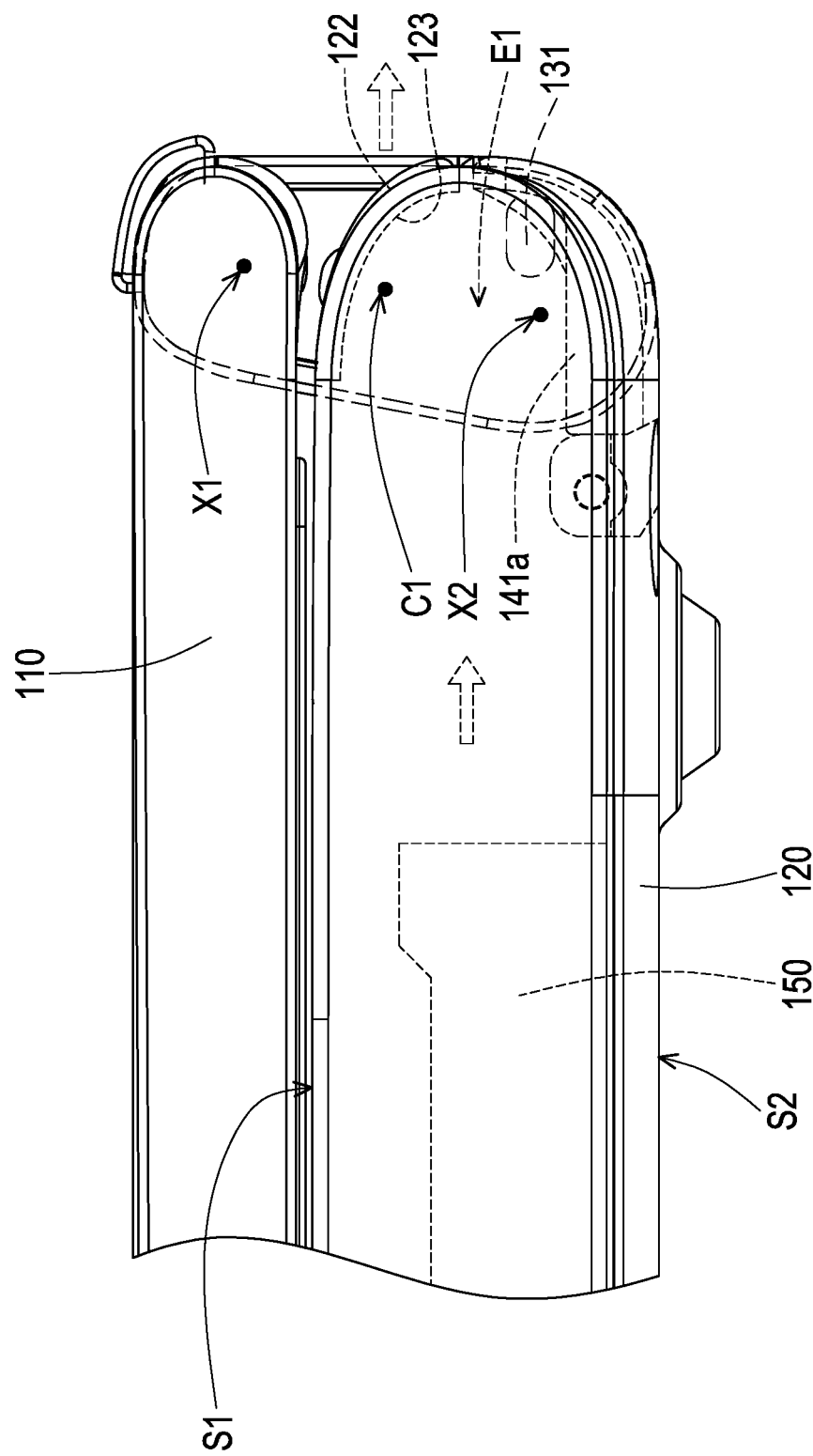
FIG. 4 is a partial side view of the electronic device.

FIG. 4 is a partial side view of the electronic device which reflects the state of the electronic device 100 in FIG. 3, which is also equivalent to the state shown in FIG. 1A and FIG. 1B. At this time, the first body 110 of the electronic device 100 is closed and stacked on a top surface S1 of the second body 120, and the keyboard and the touch panel of the notebook computer are arranged on the top surface S1. Referring to FIG. 4 first and comparing it with FIG. 1A and FIG. 1B, the second body 120 of the embodiment is located between a pair of hinge modules 130 and there is an upper edge structure 123 opposite to the cover 140, and there is a plurality of third openings 122 located on the upper edge structure 123 and beside the cover 140. The cover 140 can be regarded as the movable lower edge structure of the second body 120, and when the cover 140 is closed on the second body 120, it is complementary to the structural outline of the second body 120. That is to say, the cover 140 in the folding state can be regarded as the partial outline of the second body 120.

Then, referring to FIG. 3 and FIG. 4 again, the electronic device 100 further includes a fan 150, such as a centrifugal fan, which is arranged in the second body 120 and the air outlet is facing the third openings 122 and the cover 140. At the same time, the second body 120 also has a plurality of second openings 121 on its bottom surface S2, facing the air inlet of the fan 150, so that the fan 150 can absorb cold air from the external environment through the second openings 121. As shown in FIG. 1A, FIG. 1B and FIG. 4, when the cover 140 is closed on the second body 120, the airflow from the fan 150 is discharged from the second body 120 through the third openings 122. Relatively, the second body 120 is also provided with slits or holes on the top surface S1 without affecting the function of its input module (such as a keyboard or a touch panel), which is beneficial for the fan 150 to absorb cold air from the external environment to dissipate heat.

It should also be mentioned that, since the hinge module 130 of the embodiment is a dual hinge module, it will further allow the first hinge 134 and the second hinge 135 to form a rotation center C1 during the rotation process. Here, it can also be regarded as the rotational axis, that is, the rotational axis (center) C1 is located between the rotational axis X1, X2 and is parallel to each other. At the same time, it also enables the first body 110 to rotate from the first state stacked on the top surface S1 of the second body 120 to the second state stacked on the bottom surface S2 of the second body 120, which will be further described later.

More importantly, the protruding rod 131 extending from the casing 138 is adjacent to the second hinge 135, and is eccentric to the rotation center (axis) C1, the rotation axis X1 and the rotation axis X2. In this way, during the rotation of the hinge module 130, the protruding rod 131 is equivalent to rotating relative to the rotation center (axis) C1. Therefore, the convex seat 141a of the cover portion 141 can be pushed smoothly to achieve the effect of driving the cover 140.

Figure 5A:
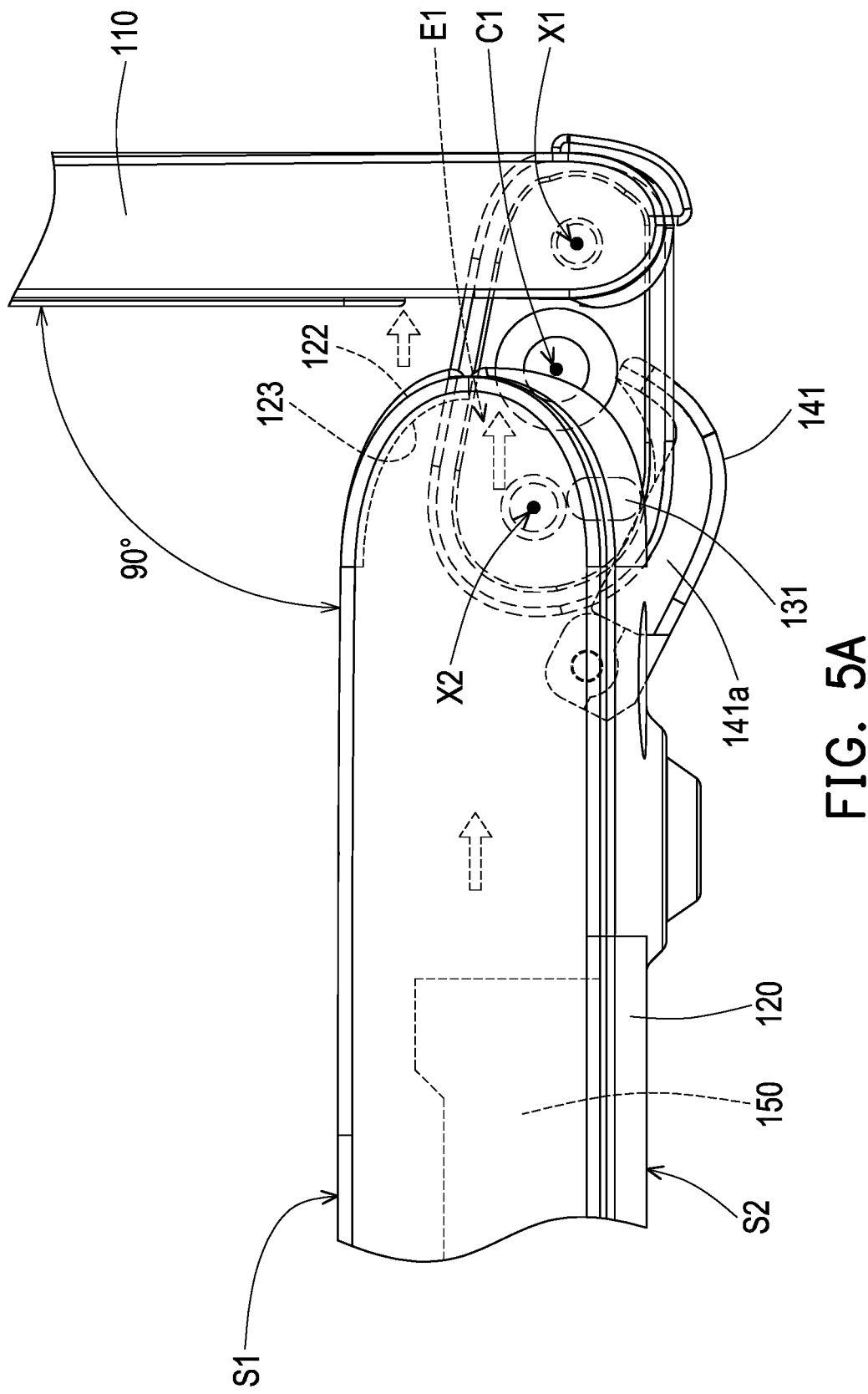
FIG. 5A is a partial side view of the electronic device in another state.
Figure 5B:
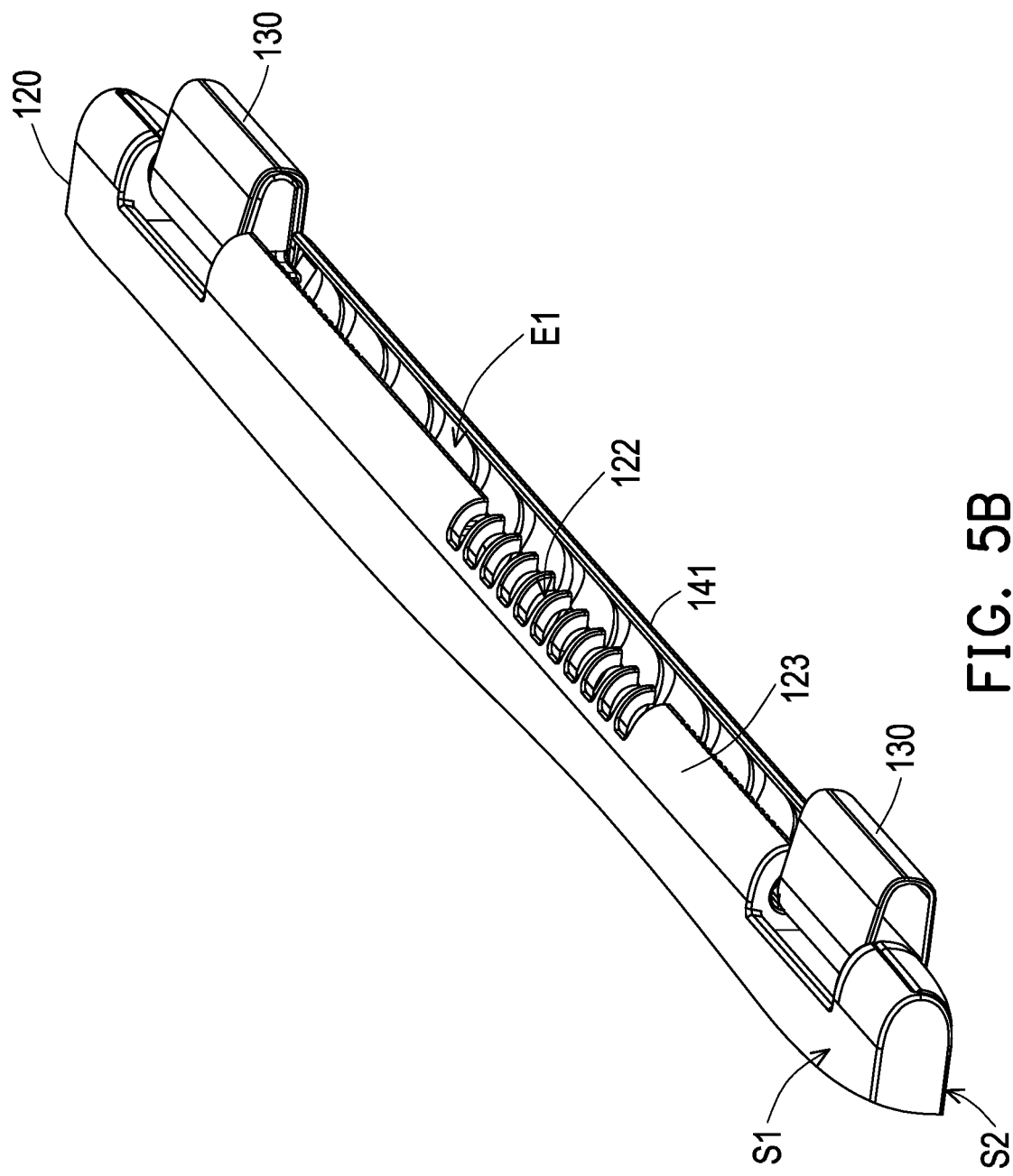
FIG. 5B is a partial perspective view of the electronic device of FIG. 5A.

FIG. 5A is a partial side view of the electronic device in another state. FIG. 5B is a partial perspective view of the electronic device of FIG. 5A. Referring to FIG. 5A and FIG. 5B at the same time, the first body 110 of the electronic device 100 is unfolded to 90 degrees relative to the second body 120 (here, the first state shown in FIG. 4 is defined as 0 degrees) at this time. At the same time, the cover portion 141 of the cover 140 is also driven by the protruding rod 131 of the hinge module 130 to be unfolded relative to the second body 120, thus forming a first opening E1. In this way, the airflow generated by the fan 150 can pass through the first opening E1 and the third openings 122 to the second body 120, which is equivalent to increasing the airflow discharge area and improving the heat dissipation performance. As shown in FIG. 5B, there is no limit to the number of the third openings 122 and the (horizontal) size of the cover portion 141, which can be properly adjusted according to the number and size of the air outlets of the fan 150. For example, the number of the third openings 122 and the (horizontal) size of the cover portion 141 can be consistent with the size of the air outlet of the fan 150.

In addition, the designer can further make appropriate adjustments according to the settings of the hinge module 130. For example, in another non-illustrated embodiment, the foldable electronic device connects the first body and the second body with a single hinge module, and a pair of covers are arranged on opposite sides of the hinge module to facilitate corresponding two fans arranged in the second body.

Figure 6:
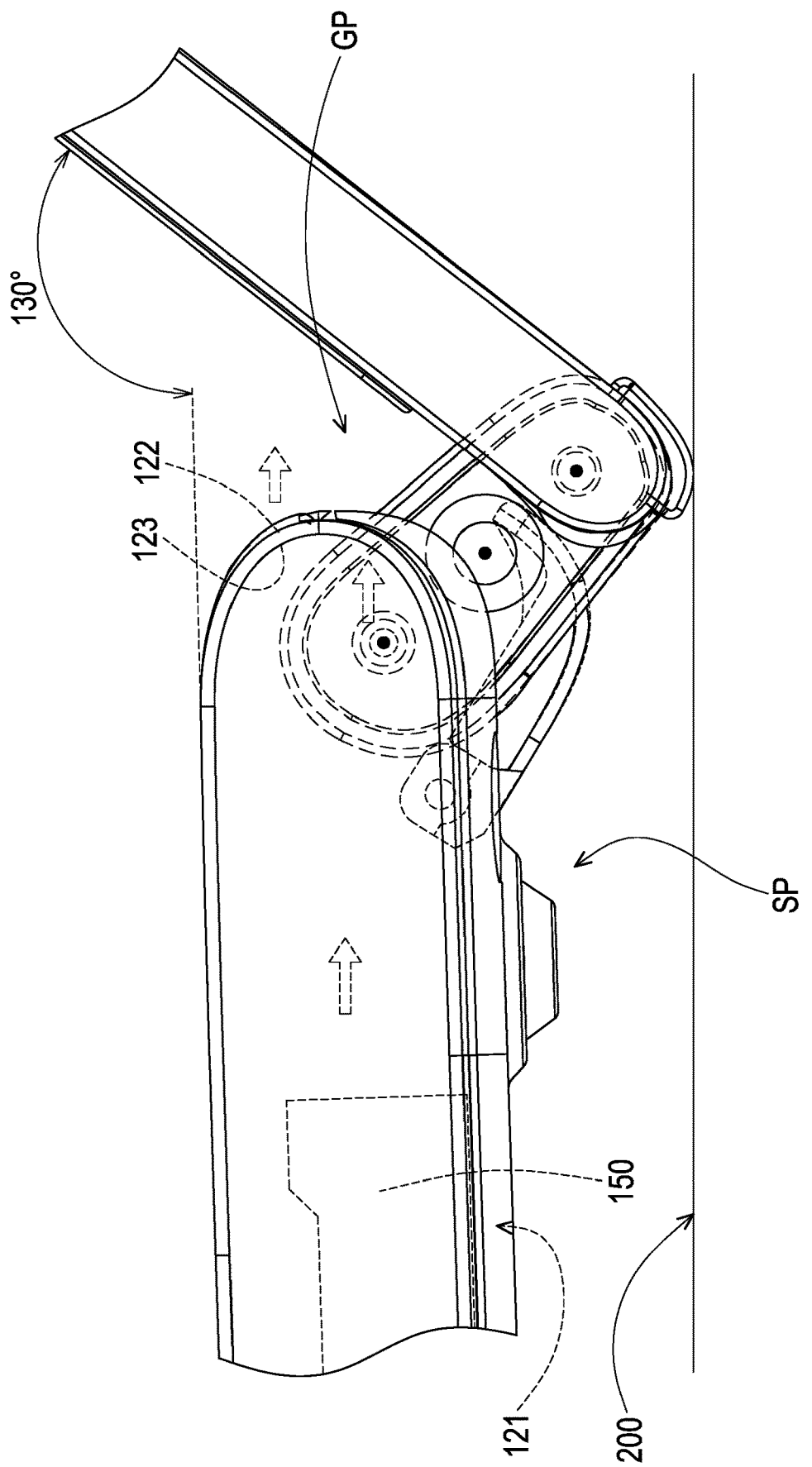
FIG. 6 is a partial side view of the electronic device in another state.

FIG. 6 is a partial side view of the electronic device in another state. Referring to FIG. 6 and comparing FIG. 4 and FIG. 5A, the first body 110 and the second body 120 shown in FIG. 6 are unfolded to 130 degrees due to the hinge module 130. Meanwhile, for the electronic device 100, it is suitable to be placed on the platform 200 (or desktop). Therefore, the state shown in FIG. 6 can be produced at 130 degrees, that is, the first body 110 is unfolded relative to the second body 120 through the hinge module 130. At the same time, the bottom of the first body 110 is abutted against the platform 200 and the part of the second body 120 is pushed away from the platform 200 to generate a space SP, that is, the space SP is formed between the second openings 121 and the platform 200. In this way, it can help the fan 150 absorb the cold air from the space SP through the second openings 121.

More importantly, due to the setting characteristics of the hinge module 130, the first body 110 and the second body 120 may form a gap GP between each other. However, due to the setting of cover 140, it is blocked between the gap GP and the space SP when it is unfolded relative to the second body 120. In other words, the airflow discharged from the fan 150, for example, dissipates heat to the heat dissipation fins (not shown) disposed in the second body 120, and after the airflow absorbs heat from the heat dissipation fins, it is discharged from the second body 120 through the third openings 122 and first opening E1. At this time, the airflow discharged from the second body 120 can block the airflow to the space SP because the cover 140 in the unfolded state is blocked between the gap GP and the space SP. In this way, the cover 140 can ensure that the air drawn by the fan 150 from the second openings 121 is the cold air of the external environment, rather than the aforementioned hot air just discharged from the second body 120. Therefore, the airflow blocking effect produced by the cover 140 is beneficial to the improvement of heat dissipation performance.

Figure 7A:
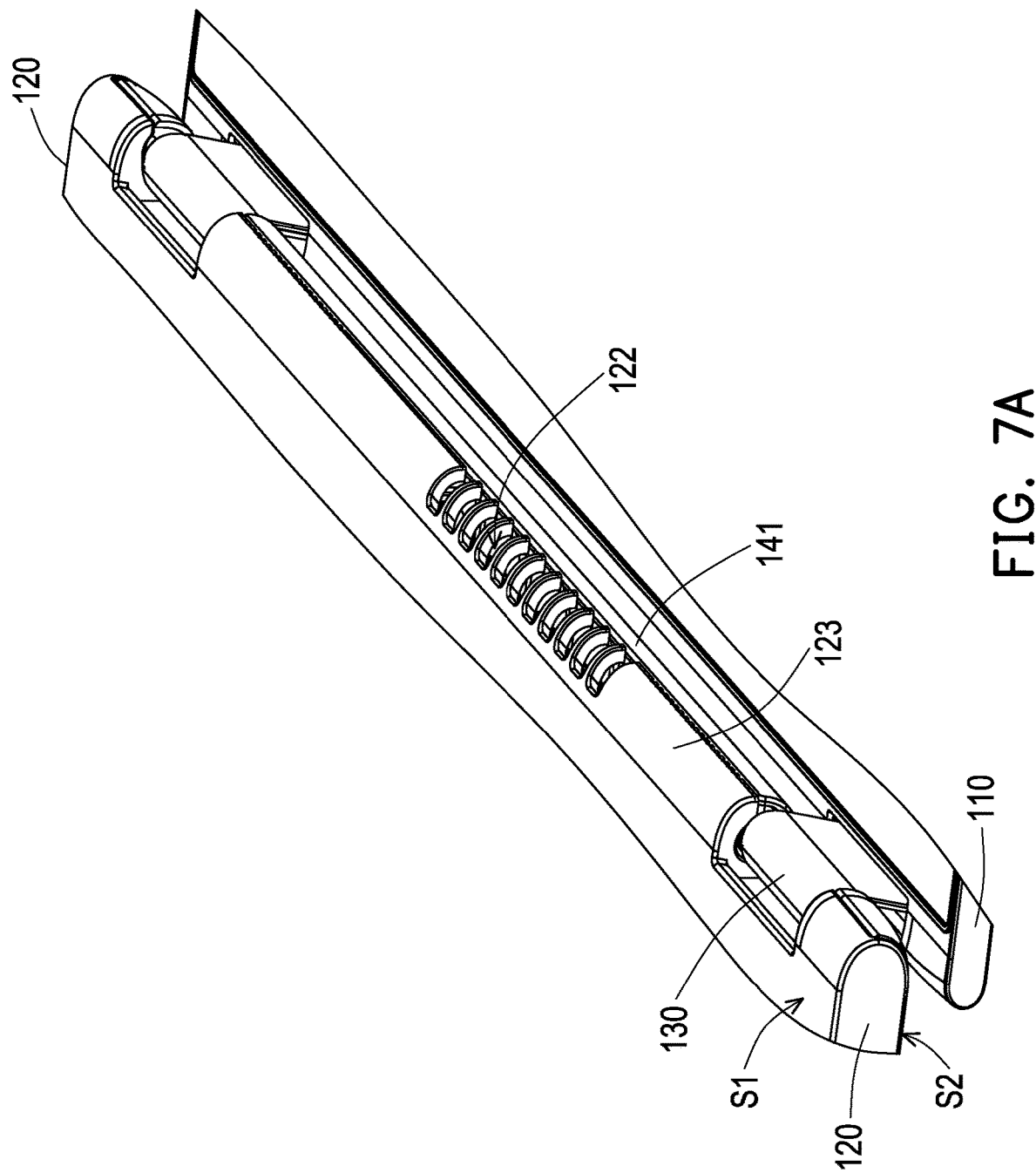
FIG. 7A is a partial perspective view of the electronic device in another state.
Figure 7B:
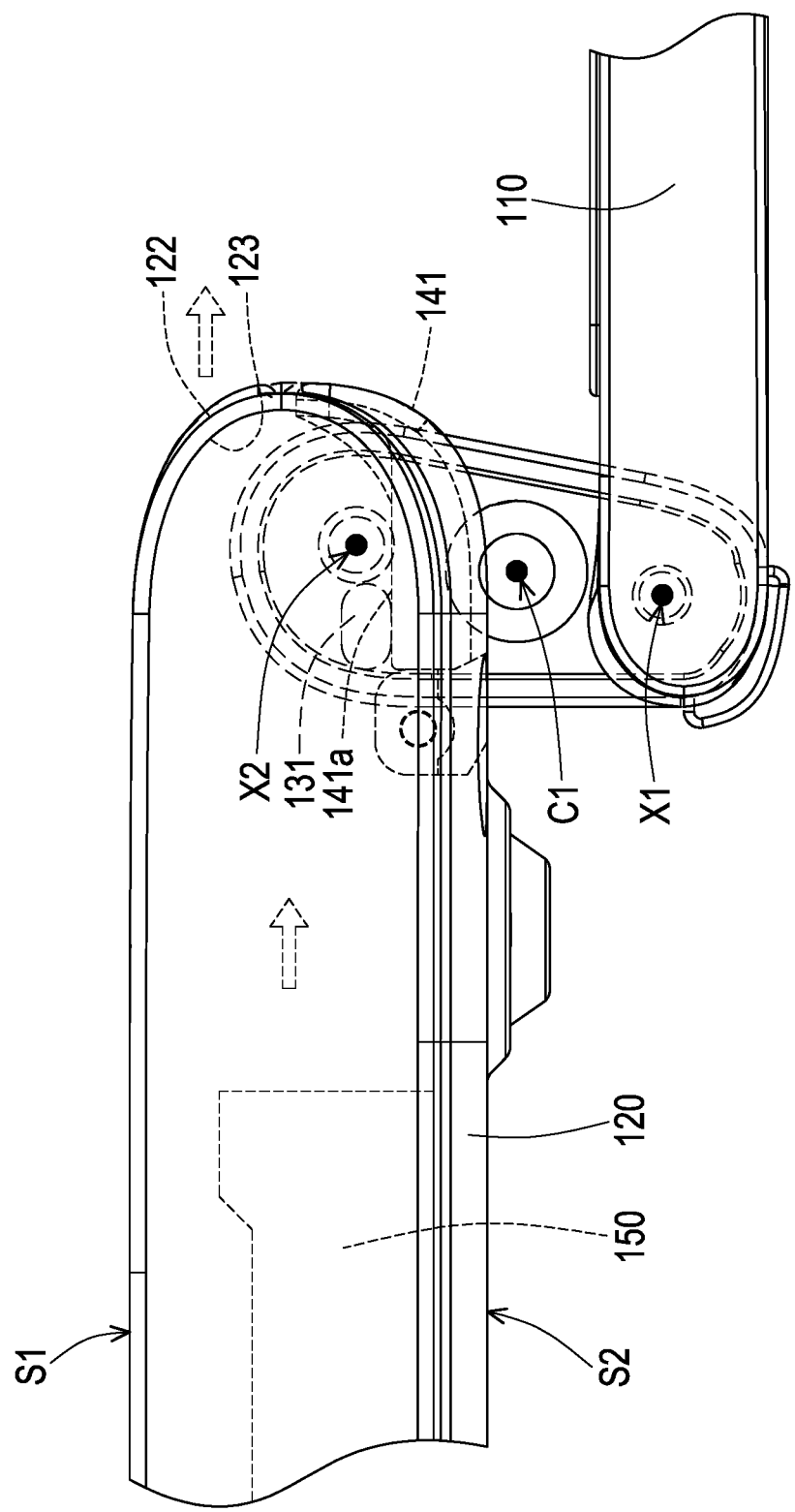
FIG. 7B is a partial side view of the electronic device of FIG. 7A.

FIG. 7A is a partial perspective view of the electronic device in another state. FIG. 7B is a partial side view of the electronic device of FIG. 7A. Referring to FIG. 7A and FIG. 7B at the same time, it is shown that the first body 110 and the second body 120 of the electronic device 100 are unfolded to 180 degrees relative to each other, and at this time the cover 140 has been closed on the second body 120 again. Thus, the fan 150 exhaust airflow will be the same as shown in FIG. 4, only passing through the third openings 122 to exit the second body 120.

Figure 8A:
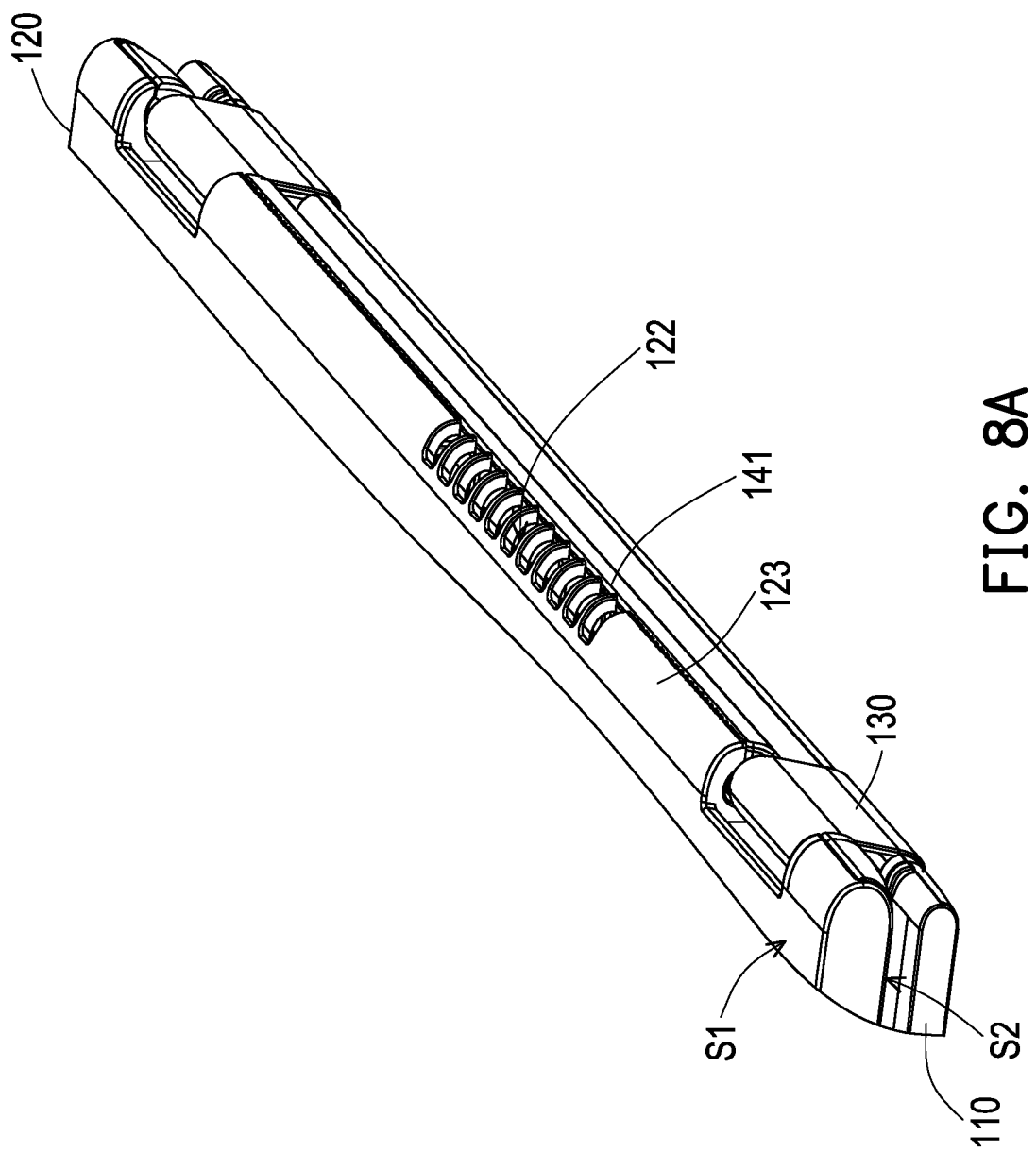
FIG. 8A is a partial perspective view of the electronic device in another state.
Figure 8B:
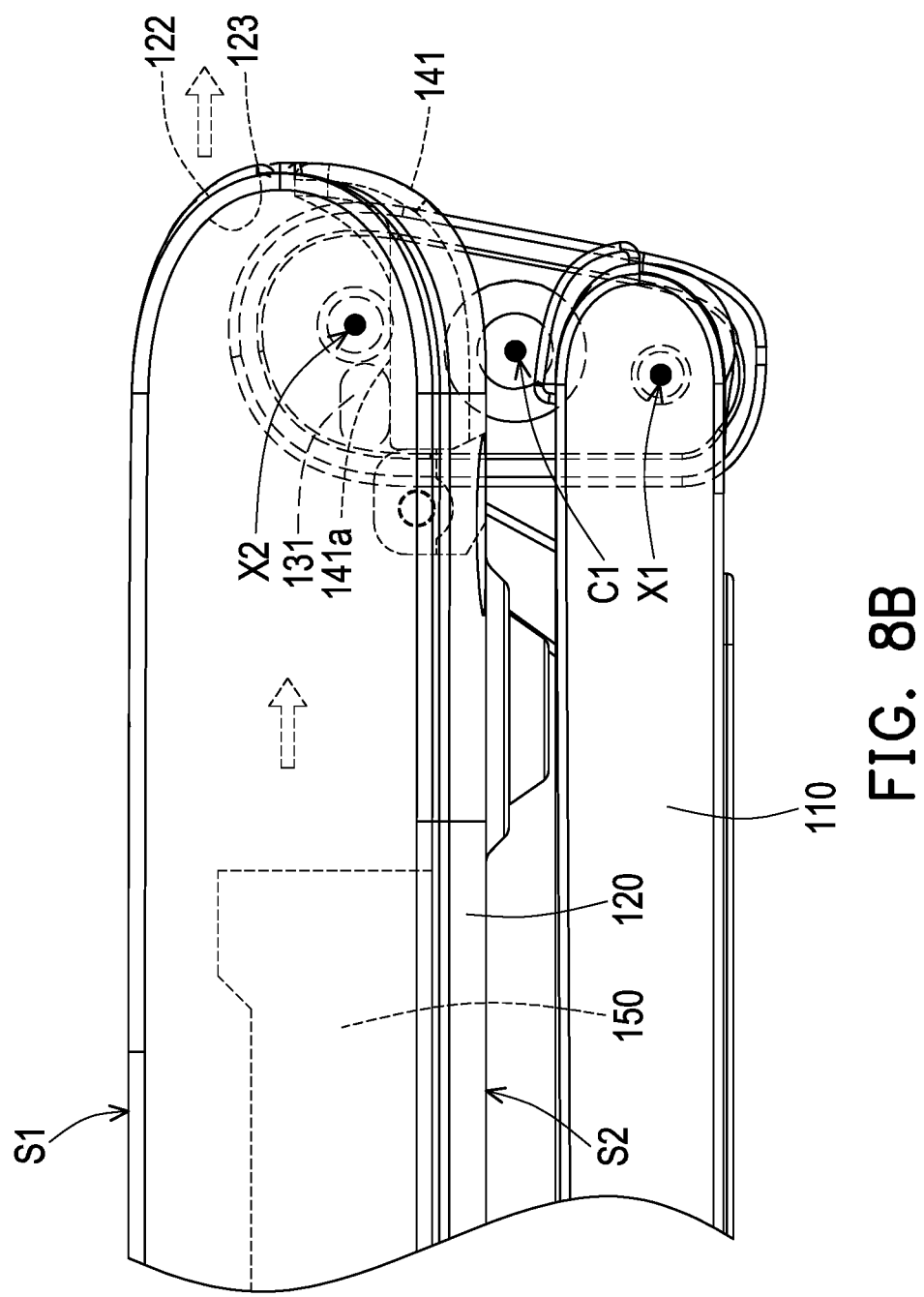
FIG. 8B is a partial side view of the electronic device of FIG. 8A.

FIG. 8A is a partial perspective view of the electronic device in another state. FIG. 8B is a partial side view of the electronic device of FIG. 8A. Referring to FIG. 8A and FIG. 8B at the same time, it is shown the state that the first body 110 and the second body 120 of the electronic device 100 are unfolded to 360 degrees relative to each other, that is, the second state in which the aforementioned first body 110 is stacked on the bottom surface S2. At this time, the cover 140 still maintains the same state as shown in FIG. 7A and FIG. 7B and is closed on the second body 120, so the airflow also only passes through the third openings 122 to discharge the second body 120.

From the above-mentioned FIG. 4, FIG. 5A, FIG. 6, FIG. 7B and FIG. 8B in sequence is the process of the electronic device 100 transforming from the first state (FIG. 4) to the second state (FIG. 8B). In this transformation process, the cover 140 is first unfolded and then closed relative to the second body 120. Furthermore, taking the second body 120 as a reference, the first body 110 in the first state is configured at 0 degrees, as shown in FIG. 1A, FIG. 1B and FIG. 4. The first body 110 in the second state is configured in 360 degrees, as shown in FIG. 8A and FIG. 8B. When the first body 110 is converted from a 180-degree configuration to a 360-degree configuration, the cover 140 is always closed on the second body 120, as shown in FIG. 7B and FIG. 8B. The opening and closing timing of the cover 140 in the embodiment depends on the usage status of the electronic device 100. For the notebook computer with a reversible screen in the embodiment, in the tablet-like mode of FIG. 7B and the tablet mode of FIG. 8B, considering that it is not fully functional, the cover 140 maintains its state closed on the second body 120. On the contrary, in the operation mode of FIG. 5A or FIG. 6, it may be required to operate at full capacity, so the cover 140 needs to be unfolded relative to the second body 120. However, it is predictable that the designer can still properly adjust the opening and closing timing of the cover 140 based on the above structural features. For example, the designer can adjust the position of the protruding rod 131 relative to the rotation center C1, or adjust the surface profile of the convex seat 141a. Therefore, when the hinge module 130 rotates, the corresponding moving trajectories of the protruding rod 131 and the convex seat 141a are changed, thereby achieving the above-mentioned effect of changing the timing of opening and closing.

In summary, in the above-mentioned embodiment of the invention, since the cover of the foldable electronic device is driven by the protruding rod of the hinge module, the cover can be synchronously driven to rotate to be folded or unfolded relative to the second body during the rotation for folding and unfolding process of the first body and the second body through the hinge module. Furthermore, the second body can provide additional exhaust openings due to the rotating and unfolding of the cover, so as to improve the heat dissipation performance of the foldable electronic device.

Furthermore, the upper edge of the rear side of the second body of the foldable electronic device is provided with a plurality of openings, and the cover body is movably arranged on the lower edge of the rear side. And the air outlet of the fan in the second body is facing the upper and lower edges of the rear side. In this way, when the cover is closed on the second body, the airflow produced by the fan absorbs the heat in the second body, and is discharged from the second body through the opening on the upper edge. When the cover is unfolded relative to the second body, the airflow can pass through the opening on the upper edge and the new opening formed by the unfolding of the cover to exit the second body. In other words, the unfolded state of the cover relative to the second body can provide an additional outlet for airflow.

More importantly, the unfolded cover blocks between the gap between the first body and the second body and the space formed after the second body is lifted off the platform. Therefore, it is possible to prevent the exhausted airflow from flowing to the bottom of the second body and being drawn into the second body by the fan. It is equivalent to ensuring that what the fan draws from the bottom of the second body is the cold air from the external environment, so as to maintain and improve the cooling performance of the current state.

What is claimed is:
1. A foldable electronic device, comprising:
a first body;
a second body;
a hinge module, connected to the first body and the second body, such that the first body and the second body are rotated relatively to be folded or unfolded via the hinge module, and the hinge module has a protruding rod eccentric to a rotation center of the hinge module; and
a cover, pivoted to the second body and located on a moving path of the protruding rod, and the hinge module drives the cover to be rotated relative to the second body via the protruding rod, wherein the second body has a top surface and a bottom surface opposite each other, the first body is rotated between a first state and a second state by the hinge module relative to the second body, the first body overlaps the top surface in the first states, the first body overlaps the bottom surface in the second state, and the cover is unfolded and then closed relative to the second body during the transition.

2. The foldable electronic device according to claim 1, wherein the cover and the second body are complementary to each other in structural outlines.

3. The foldable electronic device according to claim 1, wherein the hinge module comprises a first hinge and a second hinge which are mutually restricted, the first hinge is connected to the first body, the second hinge is connected to the second body.

4. The foldable electronic device according to claim 3, wherein the protruding rod is adjacent to the second hinge.

5. The foldable electronic device according to claim 3, wherein the protruding rod is eccentric to an axis of the first hinge.

6. The foldable electronic device according to claim 3, wherein the protruding rod is eccentric to an axis of the second hinge.

7. The foldable electronic device according to claim 3, wherein the rotation center is located between the axis of the first hinge and the axis of the second hinge.

8. The foldable electronic device according to claim 1, further comprises a fan disposed in the second body, the cover is expanded with respect to the second body to form a first opening, an air outlet of the fan faces the first opening, and an airflow generated by the fan is suitable for passing out of the second body through the first opening.

9. The foldable electronic device according to claim 8, suitable for placing on a platform, when the first body is rotated and unfolded relative to the second body by the hinge module, the first body abuts against the platform and pushes part of the second body away from the platform to form a space, and the cover rotates relative to the second body and blocks a gap between the first body and the second body to prevent the airflow from passing through the gap to the space.

10. The foldable electronic device according to claim 9, wherein a bottom of the second body comprises a second opening facing an air inlet of the fan, when part of the second body is pushed away from the platform by the first body, the space is formed between the second opening and the platform.

11. The foldable electronic device according to claim 8, wherein the second body further comprises a third opening located next to the cover, the air outlet of the fan faces the third opening and the cover, when the cover is closed on the second body, the airflow generated by the fan is sent out of the second body through the third opening, when the cover is unfolded relative to the second body, the airflow generated by the fan is sent out of the second body through the first opening and the third opening.

12. The foldable electronic device according to claim 1, wherein taking the second body as a reference, the first body in the first state is configured at 0 degrees, and the first body in the second state is configured in 360 degrees, when the first body is configured from 180 degrees to 360 degrees, the cover is closed on the second body.

* * * * *